United States Patent
Barde et al.

(10) Patent No.: US 10,461,362 B2
(45) Date of Patent: *Oct. 29, 2019

(54) CALCIUM-BASED SECONDARY CELL AND BATTERY COMPRISING THE SAME

(71) Applicants: TOYOTA MOTOR EUROPE, Brussels (BE); CONSEJO SUPERIOR DE INVESTIGACIONES CIENTIFICAS, Madrid (ES)

(72) Inventors: Fanny Barde, Holsbeek (BE); Rosa Palacin, Barcelona (ES); Alexandre Ponrouch, Barcelona (ES)

(73) Assignees: TOYOTA MOTOR EUROPE, Brussels (BE); CONSEJO SUPERIOR DE INVESTIGACIONES CIENTIFICAS, Madrid (ES)

( * ) Notice: Subject to any disclaimer, the term of this patent is extended or adjusted under 35 U.S.C. 154(b) by 124 days.

This patent is subject to a terminal disclaimer.

(21) Appl. No.: 15/516,535

(22) PCT Filed: Dec. 22, 2014

(86) PCT No.: PCT/EP2014/079050
§ 371 (c)(1),
(2) Date: Apr. 3, 2017

(87) PCT Pub. No.: WO2016/050331
PCT Pub. Date: Apr. 7, 2016

(65) Prior Publication Data
US 2017/0294674 A1    Oct. 12, 2017

(30) Foreign Application Priority Data
Oct. 2, 2014    (ES) .................................. 201400771

(51) Int. Cl.
*H01M 10/054* (2010.01)
*H01M 4/134* (2010.01)
(Continued)

(52) U.S. Cl.
CPC ......... *H01M 10/054* (2013.01); *H01M 4/134* (2013.01); *H01M 4/38* (2013.01);
(Continued)

(58) Field of Classification Search
CPC ............... H01M 4/381; H01M 10/054; H01M 10/0568; H01M 10/0569; H01M 10/613;
(Continued)

(56) References Cited

U.S. PATENT DOCUMENTS

2003/0059684 A1    3/2003    Takami et al.
2004/0170902 A1    9/2004    Inoue et al.
2013/0319870 A1    12/2013    Chen et al.

FOREIGN PATENT DOCUMENTS

JP    2003-100347 A    4/2003
JP    2006-054150 A    2/2006
(Continued)

OTHER PUBLICATIONS

Machine translation of Japanese Patent Publication No. 2012/248470, published Dec. 13, 2012. (Year: 2012).*
(Continued)

*Primary Examiner* — Sarah A. Slifka
*Assistant Examiner* — Lilia Nedialkova
(74) *Attorney, Agent, or Firm* — Oliff PLC

(57) ABSTRACT

A calcium-based secondary cell including a negative electrode that includes a negative-electrode active material, a positive electrode that includes a positive-electrode active material, an electrolyte arranged between the negative electrode and the positive electrode, and a temperature control element. The negative-electrode active material is capable of
(Continued)

accepting and releasing calcium ions, and the positive-electrode active material is capable of accepting and releasing calcium ions. The electrolyte includes calcium ions and an electrolyte medium, and is not solid at a temperature of about 20° C. and a pressure of about 1 atm. The electrolyte medium includes a non-aqueous solvent.

15 Claims, 16 Drawing Sheets

(51) Int. Cl.
*H01M 4/38* (2006.01)
*H01M 10/0568* (2010.01)
*H01M 10/0569* (2010.01)
*H01M 10/615* (2014.01)
*H01M 10/613* (2014.01)
*H01M 10/6563* (2014.01)
*H01M 10/6571* (2014.01)

(52) U.S. Cl.
CPC ....... *H01M 4/381* (2013.01); *H01M 10/0568* (2013.01); *H01M 10/0569* (2013.01); *H01M 10/613* (2015.04); *H01M 10/615* (2015.04); *H01M 4/386* (2013.01); *H01M 4/387* (2013.01); *H01M 10/6563* (2015.04); *H01M 10/6571* (2015.04); *H01M 2300/004* (2013.01); *H01M 2300/0037* (2013.01)

(58) Field of Classification Search
CPC ........... H01M 10/615; H01M 10/6563; H01M 10/6571; H01M 2300/0037; H01M 2300/004; H01M 4/134; H01M 4/38; H01M 4/386; H01M 4/387
See application file for complete search history.

(56) References Cited

FOREIGN PATENT DOCUMENTS

| JP | 2012-248470 A | 12/2012 |
| JP | 2013/020782 A | 1/2013 |
| WO | 2012/140858 A1 | 10/2012 |
| WO | 2013/139370 A1 | 9/2013 |
| WO | 2016/050331 A1 | 4/2016 |

OTHER PUBLICATIONS

Pesaran et al., "Cooling and Preheating of Batteries in Hybrid Electric Vehicles," The 6th ASME-JSME Thermal Engineering Joint Conference, 2003, p. 1-7.
Guyomard et al., "Li Metal-Free Rechareable LiMn2O4/Carbon Cells: Their Understanding and Optimization," Technical Papers: Electrochemical Science and Technology, 1992, vol. 139, p. 937.
May 29, 2018 Office Action issued in Japanese Patent Application No. 2017-517030.
Mar. 16, 2015 International Search Report issued in International Patent Application No. PCT/EP2014/079050.
Alexandre Ponrouch et al; "In search of an optimized electrolyte for Na-ion batteries;" Energy and Environmental Science; Jun. 13, 2012; vol. 5; No. 9; pp. 8572-8583.
Mar. 16, 2015 Written Opinion issued in International Patent Application No. PCT/EP2014/079050.
D. Aurbach et al., "The Electrochemical Behavior of Calcium Electrodes in a Few Organic Electrolytes," Journal of the Electrochemical Society, 1991, vol. 138, Issue 12, pp. 3536-3545.
U.S. Appl. No. 15/516,493, filed Apr. 3, 2017 in the name of Barde et al.
Jul. 17, 2018 Office action issued in U.S. Appl. No. 15/516,493.
Jan. 29, 2019 Office Action issued in Japanese Application No. 2017-517030.
May 4, 2015 International Search Report issued in International Patent Application No. PCT/EP2014/079046.
May 4, 2015 Written Opinion issued in International Patent Application No. PCT/EP2014/079046.

* cited by examiner

CALCIUM-BASED SECONDARY CELL AND BATTERY COMPRISING THE SAME

The present disclosure discloses a calcium-based secondary cell, a non-aqueous secondary battery containing the cell as well as a vehicle, an electronic device or a stationary power generating device containing the battery.

BACKGROUND

Secondary (i.e. rechargeable) electrochemical cells and batteries are a power source widely used in information-related devices, communication devices (such as personal computers, camcorders and cellular phones) as well as in the automobile industry or in stationary power generating devices. Conventional lithium-based cells typically include a positive electrode (also referred to as "cathode") and a negative electrode (also referred to as "anode") whose active materials are capable of accepting and releasing lithium ions, as well as an electrolyte arranged between the electrodes and including lithium ions. Lifetime of conventional lithium-based secondary cells and batteries is not always satisfactory. The formation of a solid-electrolyte interphase (SEI) on the negative electrode seems to be a key phenomenon when using organic solvents in rechargeable batteries. Notably, the solvent seems to decompose on initial charging and form a solid layer called the solid electrolyte interphase (SEI) which is electrically insulating but should exhibit ionic conductivity in order to allow successful battery operation. The interphase is thought to prevent further decomposition of the electrolyte upon battery cycling. SEI thus seems to play a key role in controlling cell electrochemical process, delaying of capacity fade, setting cycle life and ultimately determining cell performances. For this reason it would be desirable to provide a secondary cell/battery endowed with of a good quality SEI and/or operate the same to minimize the impact that SEI with unsatisfactory quality may have on cell/battery performances. Energy storage properties are further aspects that are not always satisfactory in conventional lithium-based secondary cells and batteries. Therefore, it would be desirable to have secondary cells endowed with higher energy density and higher capacity of its negative electrode. At the same time, the cell should be rechargeable when operated under mild temperature conditions and potential windows so as to be a commercially viable energy storage device compatible with a vast panel of final applications.

The present disclosure discloses a calcium-based secondary cell which can be effectively operated under advantageous temperature and voltage conditions, a non-aqueous secondary battery containing the cell as well as a vehicle, an electronic device or a stationary power generating device containing the battery.

DISCLOSURE

Figure 1:
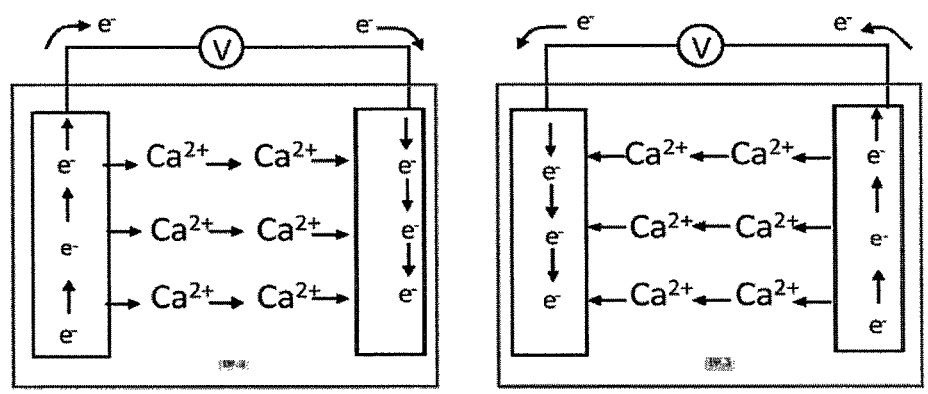
FIG. 1 is a schematic view of a calcium-based secondary cell.

In one aspect, the present disclosure discloses a calcium-based secondary cell comprising:
a negative electrode that includes a negative-electrode active material, said negative-electrode active material being capable of accepting and releasing calcium ions,
a positive electrode that includes a positive-electrode active material, said positive-electrode active material being capable of accepting and releasing calcium ions,
an electrolyte arranged between the negative electrode and the positive electrode, said electrolyte comprising, such as consisting of calcium ions and an electrolyte medium, wherein the electrolyte is not solid at standard conditions and wherein the electrolyte medium includes a non-aqueous solvent, and
a temperature control element.

The electrolyte is not solid at a temperature of about 20° C. and a pressure of 1 atm (hereinafter also referred to as standard conditions). Unless otherwise indicated, "not solid" means that at standard conditions, the electrolyte may be a liquid, a viscous mass or a gel. For example it has a viscosity of lower than 10 cP, such as lower than 8 cP, for example lower than 5 cP, when measured using a rheometer (for example a RheoStress RS600 Rheometer available from HAAKE) at standard conditions.

Advantageously, the electrolyte is endowed with one or more, such as all of the following properties:
  high ionic conductivity, such as higher than 3 mS/cm, when measured at standard conditions using a conductivity meter (for example a Oakton CON 11 standard conductivity meter),
  allow a good wettability of the battery components (such as separator and electrodes).
  substantially free of water, such that for example the electrolyte contains less than 300 ppm, such as less than 200 ppm, or less than 100 ppm, for example less than 50 ppm of water, the water content being as measured with the Karl Fischer titration technique,
  large electrochemical stability window, such as higher than 4.5V, when measured at about 75° C. using cyclic voltamperometry. Electrochemical stability window (ESW) is given in Volt. No indication of reference electrode is necessary since this ESW is the difference between the stability upon reduction and upon oxidation and thus would be the same whatever the reference electrode used. The ESW may be measured at 75° C. by assembling three electrode tight cells with calcium metal as the reference and counter electrodes and using a universally recognized method: the cyclic voltamperometry at a sweep rate of 1 mV/s,
  thermal stability when measured at a temperature comprised between about −70° C. and 300° C., such as between about −70° C. and 270° C. or between about −70° C. and 240° C. or between −30° C. and 150° C. Thermal stability may be measured with DSC measurements performed using for example a DSC 204F1 Netzsch calorimeter, with a heating rate of 10° C./min. Electrolyte stability is essentially determined by the stability of the solvent(s) contained therein. A solvent is considered to be thermally stable at a given temperature when it does not decompose at that temperature.

Calcium ions may be in the form of a calcium salt, for example and inorganic calcium salt and/or an organic calcium salt. Preferably, the salt is anhydrous.

The salt may be selected from the group consisting of calcium tetrafluoroborate ($Ca(BF_4)_2$), calcium perchlorate ($Ca(ClO_4)_2$) calcium hexafluorophosphate ($Ca(PF_6)_2$), $Ca(CF_3SO_3)_2$ and mixtures thereof. ($Ca(BF_4)_2$) and mixtures thereof may be preferred.

The salt may be dissolved in the electrolyte medium. The salt may be present in an amount comprised between 0.05M and 2M, such as between 0.1M and 1M, with respect to the volume of the electrolyte.

The electrolyte may be substantially free of other metal ions of Group I and II of the period table—for example lithium ions, sodium ions, potassium ions. This means that the amount of metal ions other than calcium possibly presents in the electrolyte is electrochemically ineffective.

The non-aqueous solvent is substantially free of water. Unless otherwise indicated, substantially free of water means that the solvent may include water in an amount equal to or lower than 300 ppm, such as equal to or lower than 50 ppm, as measured with the Karl Fischer titration technique.

Advantageously, the solvent is stable at a temperature comprised between at least −30 and 150° C. (stability window).

The solvent may be selected from the group consisting of cyclic carbonates, linear carbonates, cyclic esters, cyclic ethers, linear ethers and mixtures thereof.

Cyclic carbonates may be selected from the group consisting of ethylene carbonate (EC), propylene carbonate (PC), butylene carbonate, vinylene carbonate, fluoroethylenecarbonate (FEC) and mixtures thereof.

Linear carbonates may be selected from the group consisting of dimethyl carbonate (DMC), diethylcarbonate (DEC), ethyl methyl carbonate (EMC), and mixtures thereof.

Cyclic ester carbonates may be γ-buryrolactone and/or γ-valerolactone.

Cyclic ethers may be tetrahydrofuran (THF) and/or 2-methyltetrahydrofuran.

Linear ethers may be selected from the group consisting of dimethoxyethane (DME), ethylene glycol dimethyl ether, triethylene glycol dimethyl ether (TEDGE), tetraethyleneglycol dimethyl ether (TEDGE), and mixtures thereof.

In addition or in alternative, the solvent may include dimethylsulfoxide (DMSO) or nitrile solvents (such as acetonitrile, propionitrile, and 3-methoxypropionitrile).

The solvent may be present in an amount comprised between about 50 and 99% by mass, with respect to 100% by mass of the electrolyte. For example, the solvent may be present in an amount comprised between about 70 and 99% by mass, with respect to 100% by mass of the electrolyte. This range is preferred for having liquid electrolytes. When the electrolyte medium further includes a polymer—such as a gelling polymer—the solvent is advantageously present in an amount comprised between about 50 and 70% by mass, with respect to 100% by mass of the electrolyte. This range is preferred for having gel polymer electrolytes.

The electrolyte medium may further include a component (such as crown ethers) that facilitates calcium salt dissociation and/or enhance calcium salts dissolution.

The electrolyte medium may further include a gelling polymer. This is typically the case of gel polymer electrolytes.

The gelling polymer may be selected from the group consisting of polyethylene oxide (PEO), polyvinylidene fluoride (PVDF), polyacrylonitrile (PAN), polymethyl methacrylate (PMMA), poly(vinyl) chloride (PVC), and mixtures thereof.

When the electrolyte medium contains a gelling polymer as defined above, it may further comprise a filler, the filler including:
  a component which can be cross linked and/or thermoset for example to improve the electrolyte mechanical properties,
  a plasticizer, for example to improve the electrolyte ionic conductivity,
  nanoparticles/nanoceramics, and/or
  a component (such as crown ethers) that facilitates calcium salt dissociation and/or enhance calcium salts dissolution.

Nanoparticles/nanoceramics may include $Al_2O_3$, $SiO_2$, $ZrO_2$, MgO, and/or $CeO_2$ and may have an average particle size equal to or lower than about 15 nm (this value can be measured by methods disclosed above). This component may be added to increase the electrolyte conductivity. Suitable $Al_2O_3$ nanoparticles having an average particle size of 5.8 nm are commercially available from Aldrich Research Grade. Suitable $SiO_2$ nanoparticles having an average particle size of 7.0 nm are commercially available from Aldrich Research Grade, The filler may be present in an amount of lower than 10% by weight over the weight of the total gel polymer electrolyte.

The cell comprises a temperature control element. For example the temperature control element may not be physically part of (e.g. integral part of) the cell but they may be configured to interact. The temperature control element may be configured to provide heating functionality and/or cooling functionality, e.g. depending on whether cell is used in a context—such as a fuel engine—wherein a heat source is already present. An element configured to provide at least cooling functionality may be advantageous when considering the unavoidable self-heating of the cell when in use due to the Joule effect. Alternatively, the temperature control element may be configured to provide instructions to heating and/or cooling elements present with the cell. Background information on possible technical solutions to pre-heat high-voltage battery packs in hybrid electric vehicles up to room temperature (i.e. 25 degrees) can be found for example in A. Pesaran et al. "Cooling and Preheating of Batteries in Hybrid Electric Vehicles", The $6^{th}$ ASME-JSME Thermal Engineering Joint Conference, Mar. 16-20, 2003, TED-AJ03-633.

The temperature control element is configured to bring and/or maintain the cell at a temperature between about 30° C. and 150° C., such as between about 50° C. and 110° C., which was found to be particularly effective for operating the cell presently disclosed. Although it is not intended to be bound by any theory, it is believed that at this temperature an appropriate ionic conductivity of the SEI can be achieved also in those circumstances wherein the SEI is of unsatisfactory quality per se. Accordingly, if the cell is operated in an environment characterized by low temperatures (such as a device or vehicle exposed to winter temperatures), the temperature control element is suitably provided and/or coupled with heating means (for example pre-heating means), such as a resistance heater and/or a heat pump, so as to bring the cell to desired operating temperature. The temperature control element may also be provided with cooling means, for example a fan configured to blow forced air and/or a refrigeration unit configured to operate a refrigeration cycle, so as to maintain the cell within a suitable window of operating temperatures in case the device of the vehicle is provided with a heat source such as a fuel engine or the cell, power inverter, or other devices nearby generate heat.

According to some embodiments, the temperature control element may include cooling means only for those applications intended to be consistently exposed to temperatures above about 30° C. The temperature control element may be an integral cell thermal management device including both a heating and a cooling means. The device may be operated in a controlled manner by e.g. a computer-assisted device (also possibly part of the temperature control element) so as to reach and maintain an appropriate operating temperature depending on the ambient conditions.

The negative electrode may be an electrode comprising a negative-electrode active material, said active material including metallic calcium or a calcium alloy. Advantageously, the alloy has formula (I) $Ca_mB$ wherein m is 0≤m≤3 and B is a metal or a semi-conductor element.

The negative electrode may consist of a negative electrode active material as presently defined.

Preferably, the negative electrode active material includes, such as consist of, metallic calcium (hereinafter also referred to as "calcium metal"). Preference is due for example to the "theoretical" large capacity of calcium metal (1.34 Ah/g) and its optimal potential vs. $Ca^{2+}/Ca$.

The negative electrode may be for example a foil of metallic calcium. In this case, the metallic calcium may also play the role of current collector. A pre-formed, metallic calcium-containing negative electrode can thus be used during assembly of a calcium-based secondary electrochemical cell.

The negative electrode may include, such as consist of a support, such as a current collector, having a metallic calcium coating as negative-electrode active material. The coating is obtainable by depositing metallic calcium on the collector. The coating may be present on part of the support only or on the entire support.

The collector may be in the form of a foil, foam or grid.

The collector may comprise, such as consist of copper, aluminum, stainless steel, nickel, gold, platinum, palladium, titanium or carbon. For example, the collector may comprise, such as consist of one or more of copper, aluminum, stainless steel, nickel, gold, platinum and palladium. Alternatively, the collector may include, such as consist of, carbon for example type carbon paper. Copper, stainless steel, nickel and carbon, notably carbon and stainless steel, are cost-effective options. Use of gold or aluminum presents advantages in that these materials exhibit the lowest lattice mismatch with calcium. Carbon and aluminum present the advantage to be lighter.

Techniques are known to deposit metallic calcium on a support such as a collector. Electrochemical deposition is a possibility. In situ deposition of metallic calcium on a support previously added during cell assembly is a possibility. In situ deposition may take place while the cell is in use or in charge. In situ deposition is exemplified e.g. in examples 1 to 5 of the present disclosure. Pulsed Laser Deposition or RF sputtering are other options. In this case, a target of pure calcium metal may be used. This target is commercially available for example from American elements. Nickel foams or grids (on which metallic calcium may be deposited) are also commercially available from Goodfellow. Foams or grids made of copper or aluminum as well as carbon foams (one possible supplier of aluminum cupper or carbon foams is ERG-Materials & Aerospace Corporation) or carbon paper (one possible supplier of Carbon paper is Toray) foils or grids are also commercially available.

Use of a pre-formed, metallic calcium-containing negative electrode and metallic calcium deposition (e.g. in situ deposition) are not mutually exclusive options. If desired, metallic calcium deposition may be performed on a current collector already made of metallic calcium.

The negative electrode active material may include, such as consists of a calcium alloy having formula (I) as defined above.

In the negative electrode presently disclosed, the calcium alloy, such as an alloy of formula (I), may be such that the potential of the negative electrode is advantageously lower than 2.5V vs. $Ca^{2+}/Ca$, such as lower than 2V vs. $Ca^{2+}/Ca^+$, for example lower than 1.8V vs. $Ca^{2+}/Ca$, lower than 1.5V vs. $Ca^{2+}/Ca$. For example, the specific capacity is higher than 200 mAh/g, such as higher than 300 mAh/g.

Unless otherwise stated, the potentials (in Volt) in the present description and drawings are given versus $Ca^{2+}/Ca$. Potentials are measured by a potentiostat versus a Quasi Reference Electrode. Typically ferrocene or similar internal standard such as cobaltocene is used. Use of ferrocene is known to be suitable for works in non-aqueous media.

In formula (I), B is for example selected from the group consisting of tin (Sn), silicon (Si), germanium (Ge) and mixtures thereof. For example, the alloy of formula (I) may be $SnCa_n$, $SiCa_p$ and/or $GeCa_g$ wherein n, p and g are each independently $0 \leq n, p, g \leq 3$. Variables m, n, p and g are not necessarily integers.

Examples of suitable compounds of formula (I) containing silicon are identified below through formula, molar mass and theoretical specific capacity:

|  | Molar mass (g/mol) | Theoretical Specific capacity (mAh/g) |
|---|---|---|
| Si | 28.086 | 3818 |
| $Ca_3Si$ | 148.32 | 1084 |
| $Ca_2Si$ | 108.24 | 991 |
| $Ca_5Si_3$ (or $Ca_{5/3}Si$) | 314.65 | 852 |
| CaSi | 68.164 | 787 |
| $Ca_3Si_4$ (or $Ca_{3/4}Si$) | 232.58 | 692 |
| $CaSi_2$ (or $Ca_{0.5}Si$) | 96.250 | 557 |

Examples of suitable compounds of formula (I) containing tin are identified below through formula, molar mass and theoretical specific capacity:

|  | Molar mass (g/mol) | Theoretical Specific capacity (mAh/g) |
|---|---|---|
| Sn | 118.71 | 903 |
| $Ca_3Sn$ | 238.94 | 673 |
| $Ca_2Sn$ | 198.71 | 540 |
| $Ca_5Sn_3$ (or $Ca_{5/3}Sn$) | 556.52 | 482 |
| $Ca_7Sn_6$ (or $Ca_{7/6}Sn$) | 992.81 | 378 |
| CaSn | 158.79 | 338 |

The negative electrode active material may contain one or more distinct alloys of formula (I).

The negative electrode active material may consist of a calcium alloy as defined above.

The negative electrode may be a powder composite negative electrode. This electrode is obtainable by processing, such as compressing, a mixture (a) including, such as consisting of:
component (a1) which is the negative electrode active material, for example a calcium alloy as defined above, and
component (a2) which displays electronic conducting properties and/or electrode volume change constraining properties.

Obtaining mixture (a) may be performed by common techniques. For example, mixture (a) can be obtained by simply mixing the various components for example by means of planetary mills (such as ball miller commercially available from Fritsch).

Component (a1) may be used in an amount comprised between about 50% and about 100%, preferably between about 65% and about 95%, such as between about 70% and about 90%, for example about 75% with respect to the weight of mixture (a). Component (a2) may be used in an amount comprised between about 0% and about 40%, preferably between about 10% and about 30%, for example 25% with respect to the weight of mixture (a).

The properties of component (a2) are thought to be useful when the negative electrode is in use.

The negative electrode may be a composite film negative electrode. This electrode is obtainable by processing a slurry (b) including, such as consisting of:
component (b1) which is the negative electrode active material, for example a calcium alloy as defined above,
component (b2) which displays electronic conducting properties and/or electrode volume change constraining properties,
component (b3) which is a binder,
component (b4) which is a solvent.

As evidenced in examples 6 and 7, composite film negative electrodes are preferred over powder composite negative electrodes.

Component (b1) may be used in an amount comprised between about 50% and 90% by weight with respect to the combined weight of components (b1) to (b3), i.e. the solid content of slurry (b). When component (b1) contains silicon, for example a silicon-containing alloy of formula (I), it may be present in an amount of about 70% by weight with respect to the combined weight of components (b1) to (b3). When component (b1) contains tin, for example a tin-containing alloy of formula (I), it may be present in an amount of about 85% by weight with respect to the combined weight of components (b1) to (b3).

Component (b2) may be used in an amount comprised between about 5% and 30% by weight with respect to the combined weight of components (b1) to (b3). When component (b1) contains silicon, for example a silicon-containing alloy of formula (I), component (b2) may be present in an amount of about 22% by weight with respect to the combined weight of components (b1) to (b3). When component (b1) contains tin, for example a tin-containing alloy of formula (I), component (b2) may be present in an amount of about 7% by weight with respect to the combined weight of components (b1) to (b3).

Component (b3) may be used in an amount comprised between about 5% and 25% by weight with respect to the combined weight of components (b1) to (b3). When component (b1) contains silicon, for example a silicon-containing alloy of formula (I), component (b3) may be present in an amount of about 8% by weight with respect to the combined weight of components (b1) to (b3). When component (b1) contains tin, for example a tin-containing alloy of formula (I), component (b3) may be present in an amount of about 8% by weight with respect to the combined weight of components (b1) to (b3).

Component (b4) may be used in any amount suitable to impart a workable viscosity to the slurry. For example, it may be used in an amount of about 500% by weight with respect to the combined weight of components (b1) to (b3).

Slurry (b) may further comprise components commonly used in electrode manufacturing such as component (b5) suitable to impart self-standing properties to the negative electrode.

Components (a1) and (b1) may be in the form of particles having an average particle size falling in the range of 0.01 to 100 microns, such as in the range of 0.15 to 50 microns. Average particle size may be either communicated by particles supplier, or measured by e.g. SEM (scanning electron microscopy), TEM (transmission electron microscopy) or laser granulometry techniques.

In the context of slurry (b), component (b2) can typically facilitate slurry preparation and deposition. Components (a2) and (b2) may comprise, such as consist of particulate carbon. Particulate carbon may be selected within one or more of carbon black such as ketjen black, acetylene black, channel black, furnace black, lamp black, and thermal black; graphite, such as natural graphite, e.g., scaly graphite, artificial graphite, and expanded graphite; activated carbon from charcoal and coal; carbon fibers obtained by carbonizing synthetic fibers and petroleum pitch-based materials; carbon nanofibers; tubular carbon, such as carbon nanotubes; and graphene. A suitable conductive carbon black is Carbon Super P® commercially available from TIMCAL. The main characteristics of Super P® are their high purity, high structure and their moderate surface area. The high purity is evidenced by the low ash, moisture, sulfur and volatile contents, while their high structure is expressed by oil absorption and electrical conductivity. Super P® conductive carbon black is a carbon black with a high to very high void volume originating from the interstices between the carbon black particle due to its complex arrangement and porosity, so called structure. Such a structure allows retention of a conductive carbon network at low to very low carbon content in the electrode mix. Super P® is a material with no, or nearly no sieve residue on the 325 mesh sieve.

Component (b3) is typically used to ensure the cohesion of the negative electrode components. Component (b3) may comprise, such as consist of a thermoplastic and/or a thermosetting resin. Component (b3) may be selected from the group consisting of polyethylene, polypropylene, polytetrafluoroethylene (PTFE), polyvinylidene fluoride (PVDF), styrene-butadiene rubber (SBR), carboxymethylcellulose (CMC) or salts thereof showing various molecular weights and mixtures thereof. For example, component (b3) may be a combination of CMC and SBR.

Component (b3) may also be selected from the group consisting of tetrafluoroethylene-hexafluoropropylene copolymers, tetrafluoroethylenehexafluoropropylene copolymers (FEP), tetrafluoroethylene-perfluoroalkyl vinyl ether copolymers (PFA), vinylidene fluoride-hexafluoropropylene copolymers, vinylidene, fluoride-chlorotrifluoroethylene copolymers, ethylenetetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, and mixtures thereof.

Component (b3) may also include a copolymer having sulfonate group-terminated perfluorovinyl ether groups attached to a poly(tetrafluoroethylene) backbone. An example is copolymers commercially available under the name Nafion®. For example, the copolymer may be a dispersion of a copolymer having sulfonate group-terminated perfluorovinyl ether groups attached to a poly(tetrafluoroethylene) backbone in a mixture of water and 20% by weight of alcohol. This product is commercially available under trademark LIQUION™ from Ion Power Inc.

Component (b4) is typically used to impart a viscous aspect to slurry (b). Component (b4) may be a solvent selected from the group consisting of acetone, alcohols such as ethanol, cyclic aliphatic hydrocarbon compounds such as cyclohexane, N-methyl-2-pyrrolidone (NMP), propylene carbonate (PC), N,N-dimethylformamide, tetrahydrofuran (THF), water and mixtures thereof.

An example of component (b5) is plasticizers such as any one or more of poly ethylene glycol (PEG), crown-ethers and dibutylphtalate (DBP).

Obtaining slurry (b) may be performed by common techniques. For example slurry (b) can be obtained by dispersing solid components (e.g. components (b1) to (b3)) in component (b4) for example by means of a high-performance disperser (such as dispersers available from IKA) or an ultrasonic disperser (such as dispersers available from Hielscher) or/and by means of a centrifugal mixer (such as commercially available from Thinky). WO2013139370 discloses for example a method for manufacturing a slurry by suspending particulate carbon, a binder and optionally a catalyst in a solvent.

A composite film negative electrode as defined above (whether self-standing or supported) may be manufactured by a method comprising a step i) of depositing the negative electrode active material, e.g. in the form of a slurry (b), on a support.

Depositing may be casting or impregnating, as appropriate depending e.g. on the desired structure of the electrode (self-standing or supported on a current collector and, in this latter case, the type of current collectors used).

Casting may be performed by the Doctor Blade method, which allows a fine control of the thickness of the active material deposited layer. For casting, the support may be in the form of a foil. For casting, the support may be made of e.g. copper, aluminum, stainless steel, nickel, gold, platinum, palladium, titanium or carbon if it is a current collector or e.g. glass or Teflon for self-standing electrodes.

Impregnating may be performed as disclosed in WO2013139370 (PCT publication page 16, line 19 onward) wherein a carbon foam support is impregnated with a slurry containing particulate carbon, a binder, a solvent and optionally a catalyst for the manufacture of a negative electrode active material for lithium-air batteries. Typically, impregnating is chosen when the support is a current collector in the form of a foam.

When the negative electrode is designed to be a self-standing one, such as a self-standing film negative electrode, the method may further comprise a step ii-1) of drying the active material deposited on the support and a subsequent step iii-1) of removing, for example peeling off, the support.

Alternatively, the method may further comprise a step ii-2) of drying the active material, deposited on the support and a subsequent step iii-2) of further processing the product obtained in step ii-2). This embodiment of the method is suitable to obtain negative electrodes in which the support is a current collector as defined above and hence it is part of the final negative electrode. Further processing in step iii-2) may include a step of heat treating the product of step ii-2). Typically, heat treating is performed at a temperature lower than the melting temperature of the alloy(s) contained in the active material.

Further processing in step iii-2) may include a step of cutting and/or pressing the optionally heat-treated product of step ii-2). Typically, pressing is performed under a pressure between $10^7$ to $10^9$ Pa. Cutting and pressing may be performed in any order.

The cell may further comprise a separator. The separator may be a porous film or a non-woven fabric. For example, the separator may comprise polyethylene, polypropylene, cellulose, polyvinylidene fluoride and glass ceramics or mixtures thereof. The separator may contain the electrolyte. A secondary cell incorporating this embodiment may be obtainable by contacting, e.g. impregnating, the separator with a liquid electrolyte.

The positive-electrode active material may include any material that reacts reversibly with calcium preferably at a potential higher than −1.5V expressed versus normal hydrogen electrode (NHE). For example, the positive-electrode active material may include, such as consist of oxides of transition metals and/or periodic table Group VI elements, such as vanadium oxides, for example $V_2O_5$. Crystalline $V_2O_5$ is an example. Amorphous $V_2O_5$-containing compounds, such as compounds containing $V_2O_5$ and crystallization inhibitors are another example. These compounds turned out to be effective in hosting calcium.

The secondary cell may have any form, such as prismatic or cylindrical form.

The secondary cell presently disclosed is calcium based. This means that the redox reactions taking place at both electrodes involve calcium ions. Put it differently, and given the characteristics of the electrodes and the electrolyte arranged therebetween, the operation principle of the cell involves reaction of the positive and negative electrode active materials with calcium ions. This principle is analogous to that of e.g. conventional lithium metal or lithium-ion secondary cells but based on calcium instead of lithium. Although it is not intended to be bound by any theory, it is believed that when the negative electrode active material includes, such as consists of metallic calcium, the chemical hemi-reaction occurring at the negative electrode during cell discharge is Ca (metal)→$Ca^{2+}+2e^-$, while the chemical hemi-reaction occurring during cell charge is $Ca^{2+}+2e^-$→Ca (metal). Similarly, when the negative electrode active material includes, such as consists of a calcium alloy of formula (I) as defined above, the chemical hemi-reaction occurring at the negative electrode during cell discharge is $Ca_mB$ (alloy) →$Ca^{2+}+2m\ e^-+B$, while the chemical hemi-reaction occurring during cell charge is $Ca^{2+}+2m\ e^-+B$→$Ca_mB$ (alloy).

Advantages associated with the instant calcium-based secondary cell are for example:
- the energy density of the cell is theoretically higher than that of commercially available secondary lithium-based cells. Especially the capacity of the presently disclosed negative electrodes is higher than that of e.g. graphite-containing negative electrodes typically used in conventional lithium based cells, and
- the cell can effectively be operated at mild temperatures. In effect, as the electrolyte is non-solid at standard conditions, there is no need to adopt extremely high operating temperatures to e.g. keep it in fluid, conducting state (as it would be necessary had molten calcium salts, such as $CaCl_2$, be used as electrolyte). The operating temperatures of the present cell are acceptable to the vast majority of common applications and overlap to a large extent with those of conventional lithium-based cells. This means that the present cell can be used as power source in conventional information-related devices, communication devices (e.g. personal computers, camcorders and cellular phones), in the automobile industry and in stationary power generating devices.

Advantages of the calcium-based secondary cell presently disclosed over conventional lithium-based cells are inter alia associated with the fact that reaction of each lithium ion involves the transfer of one electron while reaction of each calcium ion involves the transfer of two electrons. The number of guest calcium ions needed to achieve a certain electrode capacity is thus half of that of lithium ions, with lower structural impact. Alternatively it can be considered that for reaction of the electrode with the same amount of ions, the electrochemical capacity is doubled for calcium with respect to lithium. The secondary cell presently disclosed is therefore endowed with an energy density that is theoretically higher than that of the commercially available secondary lithium-based cells. In particular, the capacity of the negative electrode presently disclosed is higher than that of e.g. graphite-based negative electrode typically used in lithium-based secondary batteries.

In one aspect, the present disclosure discloses a method for operating a calcium-based secondary cell, the cell comprising:
- a negative electrode that includes a negative-electrode active material, said negative-electrode active material being capable of accepting and releasing calcium ions,
- a positive electrode that includes a positive-electrode active material, said positive-electrode active material being capable of accepting and releasing calcium ions, and
- an electrolyte arranged between the negative electrode and the positive electrode, said electrolyte comprising, such as consisting of calcium ions and an electrolyte medium, wherein the electrolyte is not solid at standard conditions and wherein the electrolyte medium includes a non-aqueous solvent, the method comprising the step of setting cell operating temperature between about 30° C. and 150° C., such as between about 50° C. and 110° C. This temperature window was found to be suitable for effectively using the cell presently disclosed as energy storage device.

The step of setting the operating temperature of the cell between about 30° C. and 150° C. can be performed for example by using on a temperature control element as defined above.

Advantageously, the method further includes a step of setting negative electrode operating potential window between about −1.5V and 3.0V, such as −1.5V and 1.8V, versus $Ca^{2+}$/Ca.

The method for operating the cell may further comprise a step of providing the cell in a charged state, such as a fully charged state. In case the negative electrode active material is metallic calcium to be deposited in situ or the negative electrode active material is an alloy of formula (I) with m equal to 0, the cell is initially in a discharged state and thus requires a pre-charging step to be provided in "charged state" and thus being ready for use. In case the negative electrode active material is an alloy of formula (I) with m greater than 0 or if it already contains metallic calcium (e.g. in case the negative electrode is a pre-formed, metallic calcium-containing negative electrode), the secondary cell can be directly operated in discharge mode with no pre-charging step needed. This option might be preferred for certain applications but the alloy shall be prepared prior to cell assembly.

In one aspect, the present disclosure discloses a non-aqueous calcium-based secondary battery comprising a calcium-based secondary cell as defined above, for example a plurality of calcium-based secondary cells wherein at least one is a calcium-based secondary cell as defined above or a plurality of calcium-based secondary cells each independently being as defined above. The battery may include one or more secondary cells as defined above, and a casing. The casing may be surrounded by the temperature control element as defined above.

In one aspect, the present disclosure discloses a vehicle, such as a motor vehicle, comprising a non-aqueous calcium-based secondary battery as defined above.

In one aspect, the present disclosure discloses an electronic device, such as an information-related device or a communication device (for example a personal computer, camcorder or cellular phone), comprising a non-aqueous calcium-based secondary battery as defined above.

In one aspect, the present disclosure discloses a stationary power generating device comprising a non-aqueous calcium-based secondary battery as defined above.

EXAMPLES

The following experimental examples are illustrative and enable the functioning of the invention to be understood.

The scope of the invention is not limited to the specific embodiments described hereinafter.

Example 1

Figure 2:
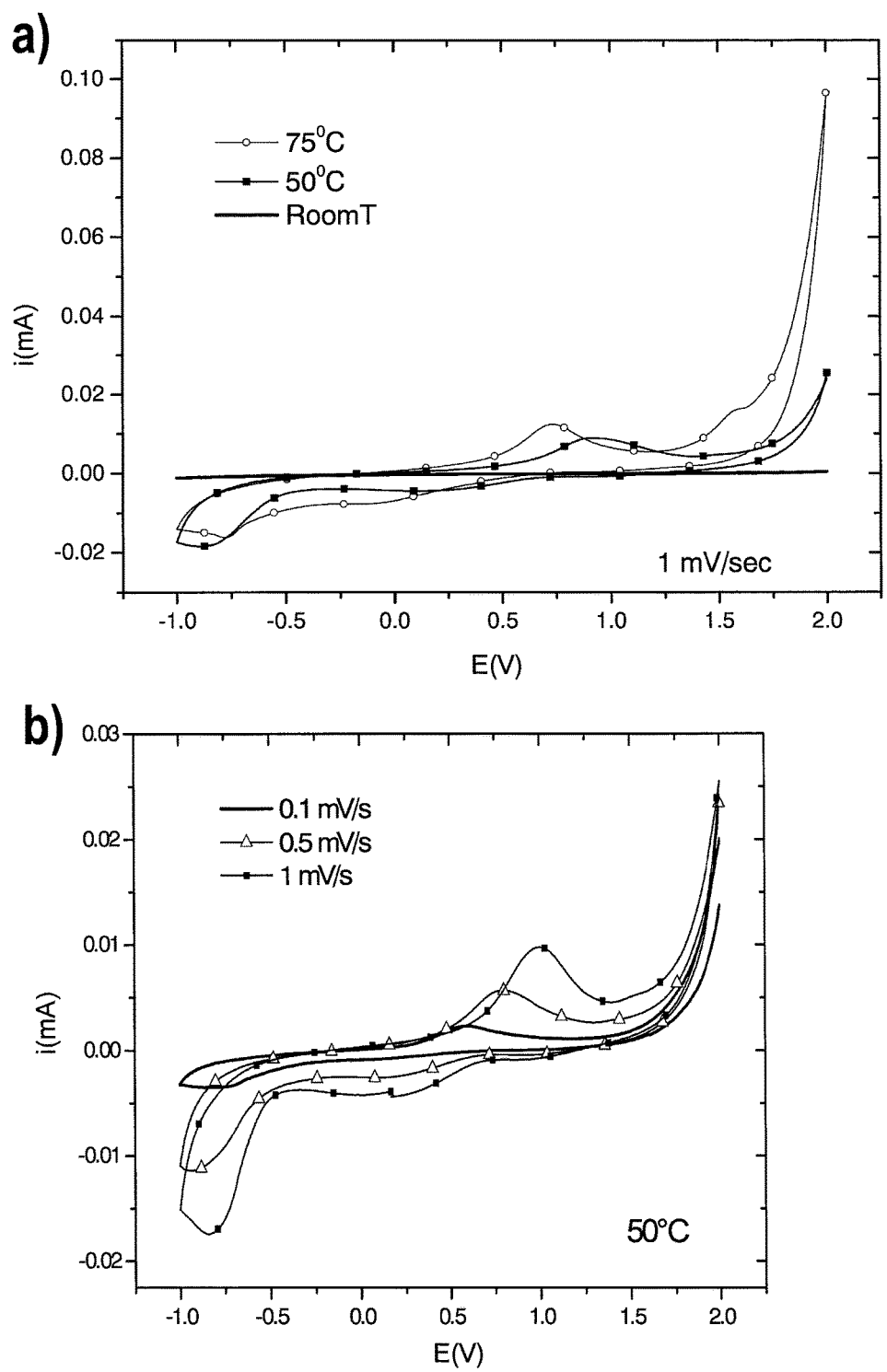
FIG. 2 are diagrams reporting cyclic voltamperommetry measurements proving the electrodeposition and stripping of calcium electrodes in certain experimental conditions. Tests conditions are 0.3M $Ca(ClO_4)_2$ in $EC_{0.5}:PC_{0.5}$; a) at 1 mV/s and various temperatures; b) at 50° C. and various sweep rates. Current collector is stainless steel.

Calcium metal negative electrode with stainless steel current collector and 0.3M $Ca(ClO_4)_2$ in $EC_{0.5}$:$PC_{0.5}$ as electrolyte Cyclic voltamperometry (CV) at 1 mV/s was performed in three electrode Swagelok type tight cells (discussed in D. Guyomard et al., *J. Electrochem. Soc.* (1992), vol. 139, p. 937) with pieces of calcium metal (provided by Aldrich) as counter and reference electrodes. The working electrode current collector was stainless steel. Two sheets of Whattman GF/d borosilicate glass fiber were used as a separator, soaked with the electrolyte (ca. 0.5 $cm^3$ of 0.3M $Ca(ClO_4)_2$ in $EC_{0.5}$:$PC_{0.5}$). CVs were performed at various temperatures (i.e. 25, 50 and 75° C.) and potential was swept between −1 and 2 V vs. $Ca^{2+}$/Ca (see FIG. 2). Significant oxidation and reduction currents were measured for temperatures above 25° C. (room temperature in FIG. 2). Indeed, an oxidation peak was observed for potential slightly higher than 0 V vs. $Ca^{2+}$/Ca which could be attributed to calcium stripping and the reduction process occurring at potentials lower than ca. −0.5 V vs. $Ca^{2+}$/Ca could be attributed to calcium plating.

Example 2

Calcium metal negative electrode with stainless steel current collector and 0.3M $Ca(BF_4)_2$ in $EC_{0.5}$:$PC_{0.5}$ as electrolyte. In this example 2, the deposition was performed at 75° C. in a potentiostatic mode (contrary to the CV technique of example 1).

Figure 3:
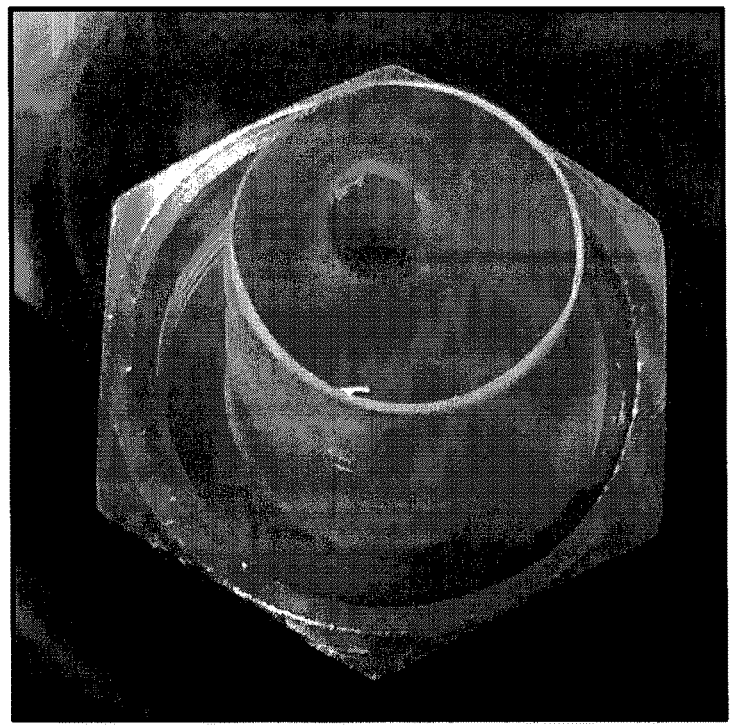
FIG. 3 is a picture of a stainless steel after calcium electroplating mode at −1 V vs. $Ca^{2+}/Ca$ in 0.3M $Ca(BF_4)_2$ in $EC_{0.5}:PC_{0.5}$ at 75° C.

A picture of a stainless steel plunger electrode after calcium deposition is displayed in FIG. 3 and a grey metallic like deposit is visible.

Example 3

Figure 4:
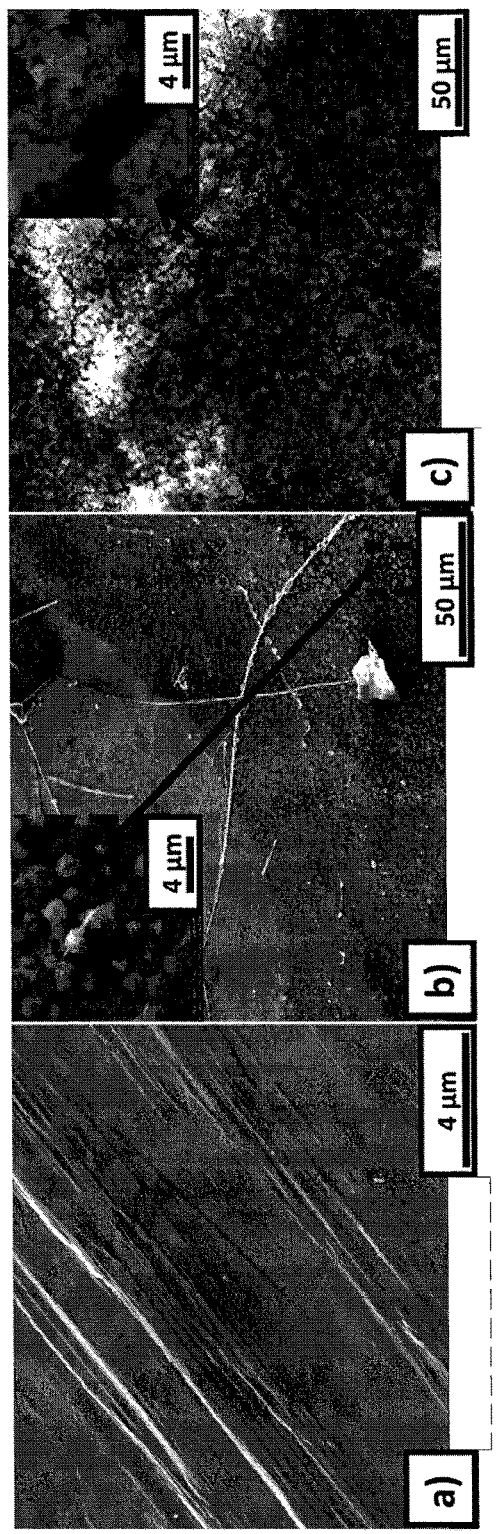
FIG. 4 are three scanning electron microscope images of copper electrode a) before and b), c) after calcium deposition in 0.3M $Ca(BF_4)_2$ in $EC_{0.45}:PC_{0.45}:DMC_{0.1}$. Calcium deposits were achieved at 75° C. in potentiostatic mode at b) −1 V vs. $Ca^{2+}/Ca$ during 80 h and c) −1.5 V vs. $Ca^{2+}/Ca$ during 200 h.
Figure 5:
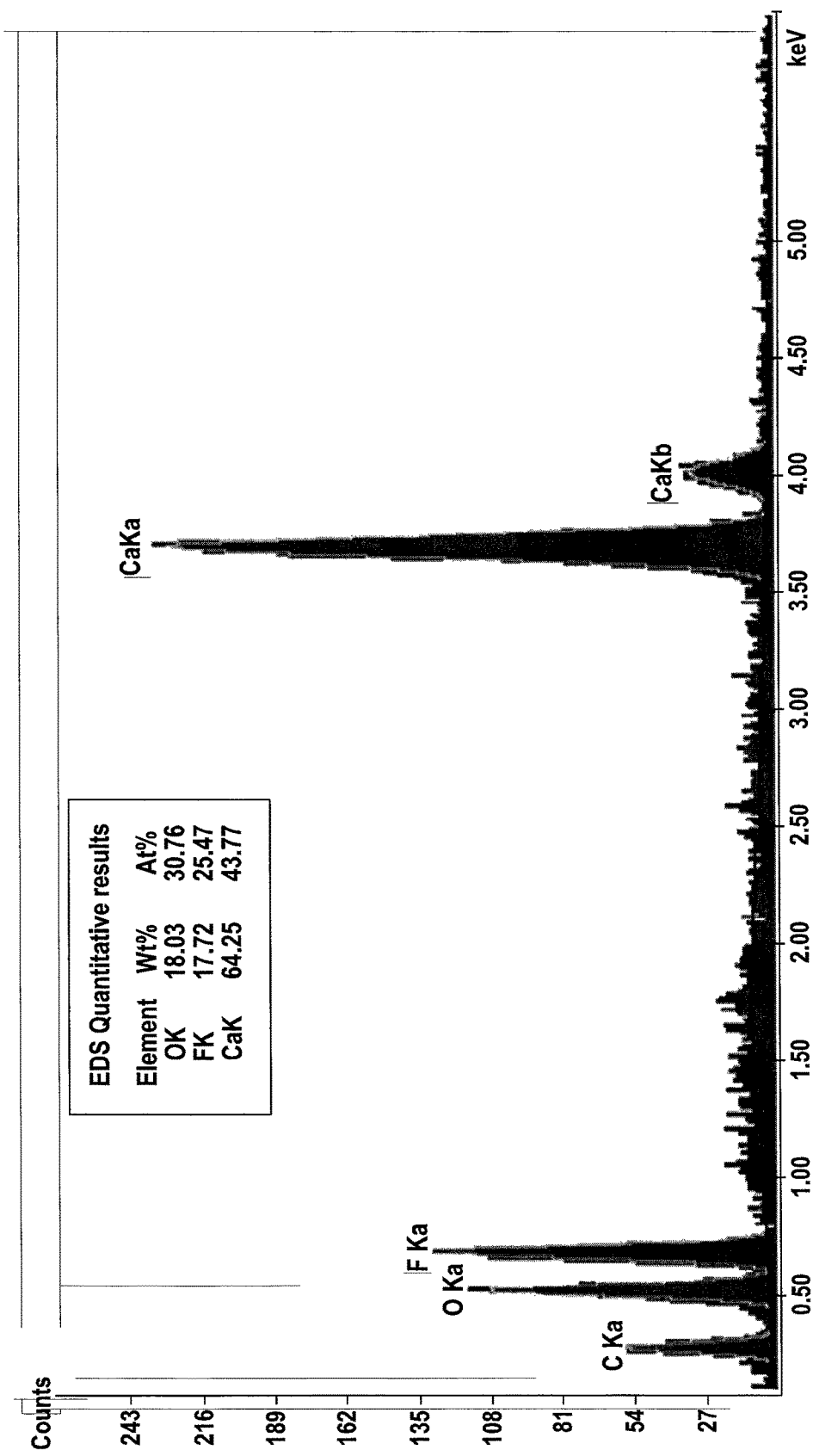
FIG. 5 is a diagram reporting the EDS quantitative analysis on calcium deposited in experiment c) as defined in FIG. 4.
Figure 6:
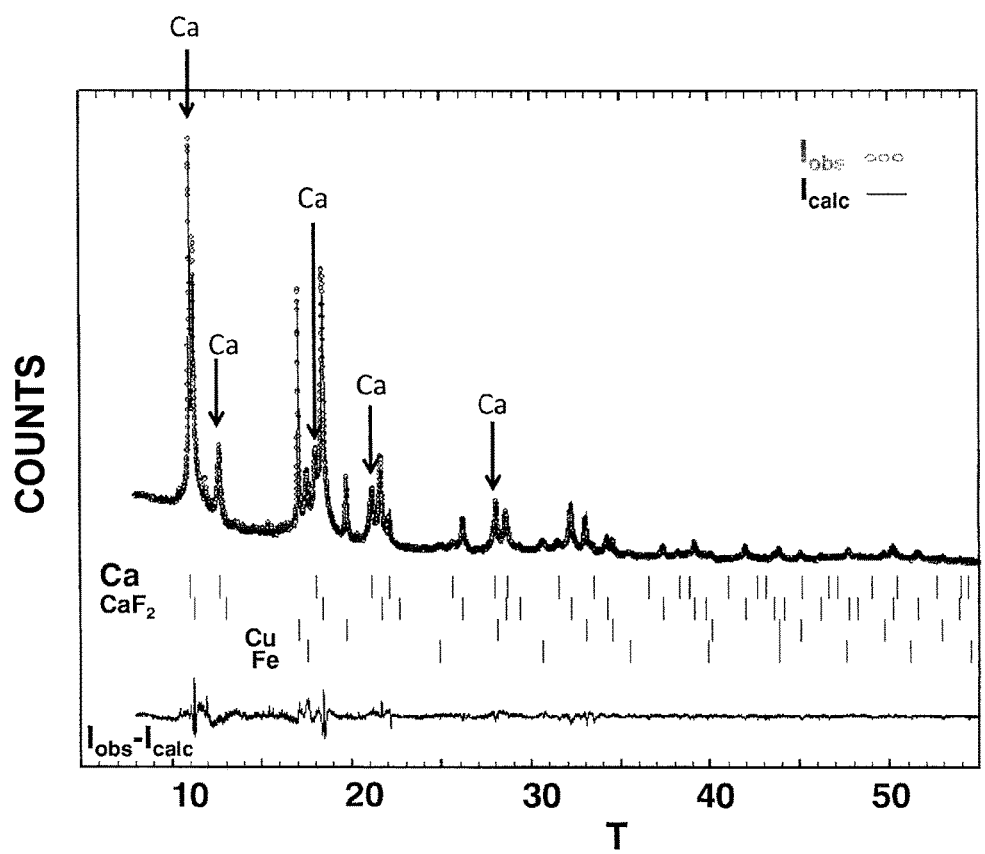
FIG. 6 is a diagram reporting the synchrotron X-ray diffraction pattern of the deposit formed on a copper disk and stainless steel plunger after calcium deposition in 0.3M $Ca(BF_4)_2$ in $EC_{0.45}:PC_{0.45}:DMC_{0.1}$ achieved in potentiostatic mode at −1.5 V vs. $Ca^{2+}/Ca$ during 200 h.

Calcium metal negative electrode with copper current collector and 0.3M $Ca(BF_4)_2$ in $EC_{0.45}$:$PC_{0.45}$:$DMC_{0.1}$ as electrolyte Calcium electroplating was performed at 75° C. for 200 h by potentiostatic deposition at −1 and −1.5 V vs. $Ca^{2+}$/Ca using two electrode Swagelok type tight cells with pieces of calcium metal as counter and reference electrode. 20 micron (μm) thick copper disks or stainless steel plungers were used as the working electrodes (i.e. calcium plating substrate). Two sheets of Whattman GF/d borosilicate glass fiber were used as a separator, soaked with the electrolyte (ca. 0.5 $cm^3$ of 0.3M $Ca(BF_4)_2$ in $EC_{0.45}$:$PC_{0.45}$:$DMC_{0.1}$). Scanning electron microscopy images of copper substrate prior to calcium deposition are shown in FIG. 4a. After 80 h deposition at −1 V vs. $Ca^{2+}$/Ca a deposit composed of micron size agglomerates can be appreciated (FIG. 4b). The deposit is very thin and the copper substrate can still be observed. For longer deposition time (i.e. 200 h) and at −1.5 V vs. $Ca^{2+}$/Ca a much thicker deposit is achieved (FIG. 4c) and from EDS analysis the main elements detected are calcium, fluorine and oxygen, the copper EDS peaks being barely detected (<5% at., FIG. 5), which indicates that the calcium deposit is at least micron thick. Thick deposits were scratched from the surface of the working electrode and filled inside capillaries that were further sealed under Argon atmosphere. X-ray diffraction was performed using synchrotron radiation (ALBA) and aside from substrate contaminations all peaks (FIG. 6) an be attributed to either calcium metal or $CaF_2$, the latter being a component of the solid electrolyte interphase due to electrolyte decomposition.

Example 4

Figure 7:
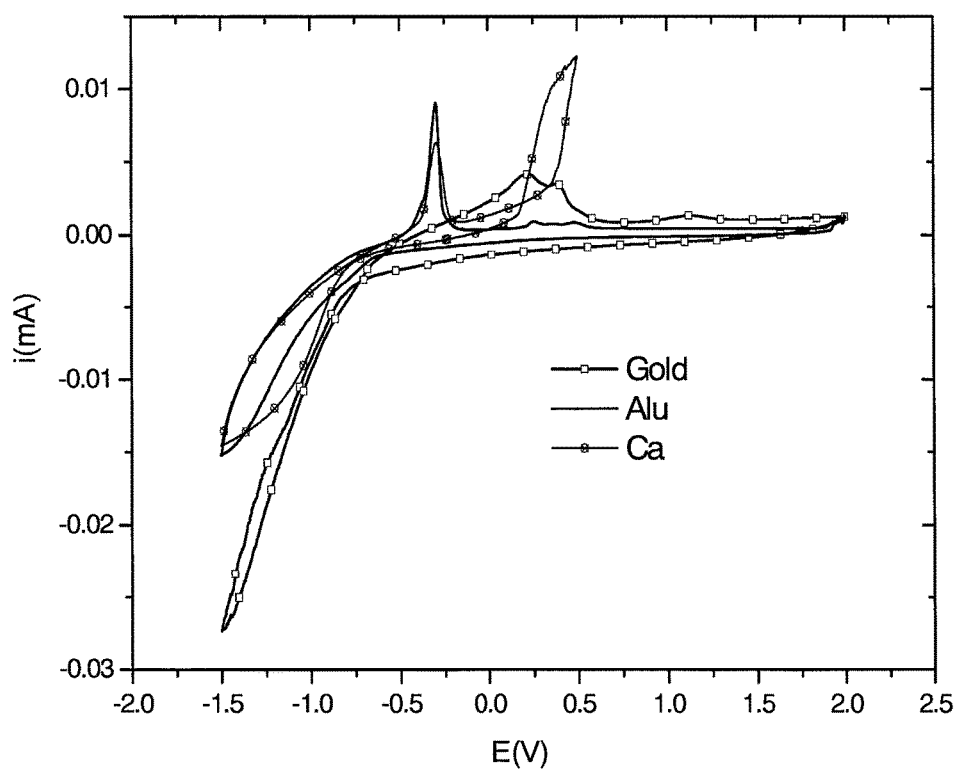
FIG. 7 is a diagram reporting cyclic voltamperommetry measurements on electrodeposited calcium obtained after 200 h potentiostatic deposition at −1.5 V vs. $Ca^{2+}/Ca$, the electrolyte being 0.3M $Ca(BF_4)_2$ in $EC_{0.45}:PC_{0.45}:DMC_{0.1}$ using various current collectors (calcium, aluminum, gold). In all cases, the sweep rate was 1 mV/s.

Calcium metal negative electrode with various current collectors and 0.3M $Ca(BF_4)_2$ in $EC_{0.45}$:$PC_{0.45}$:$DMC_{0.1}$ as electrolyte The same electrochemical set up was used as in example 3, except that we tested here the effect of various current collectors (FIG. 7).

Example 5

Calcium metal negative electrode with current collector composed of gold deposited onto the stainless steel and xM $Ca(BF_4)_2$ in $EC_{0.45}$:$PC_{0.45}$:$DMC_{0.1}$ as electrolyte (x=0.3; 0.65; 1).

Figure 8:
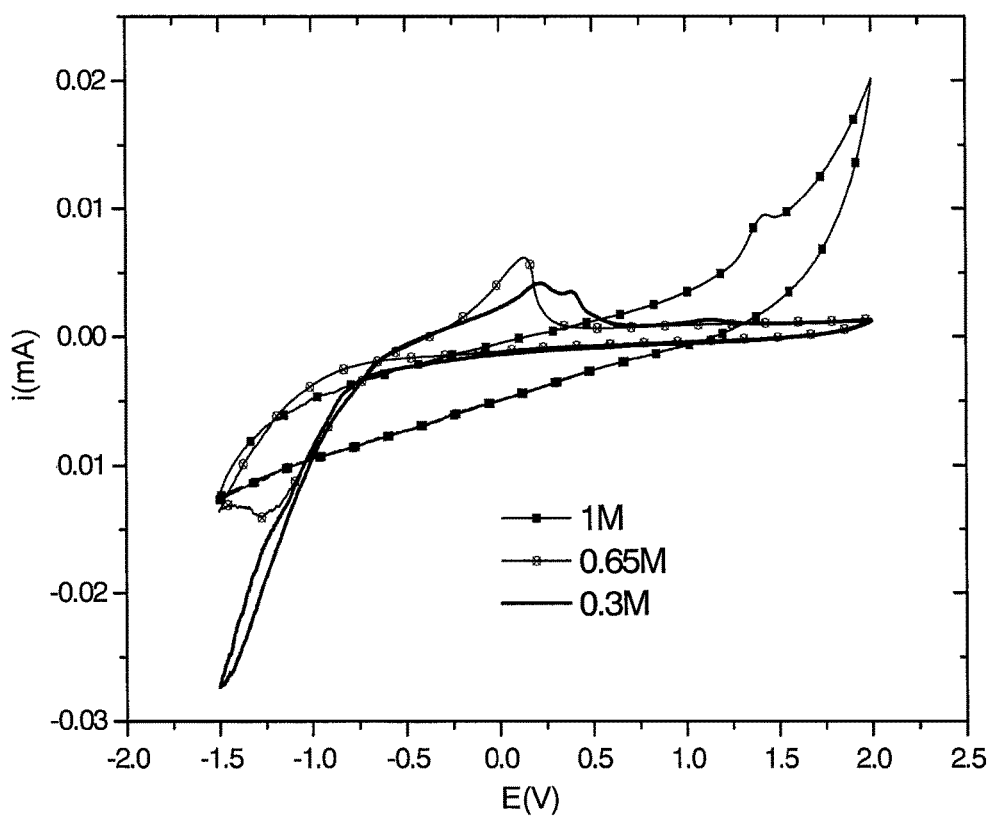
FIG. 8 is a diagram reporting cyclic voltamperommetry measurements on electrodeposited calcium obtained after 200 h potentiostatic deposition at −1.5 V vs. $Ca^{2+}/Ca$, the electrolyte being $Ca(BF_4)_2$ in $EC_{0.45}:PC_{0.45}:DMC_{0.1}$ at various salt concentrations (0.3, 0.65 and 1 M). In all cases, the sweep rate was 1 mV/s and the current collector was gold.

The same electrochemical set up was used as in example 3, except that we tested here the effect of various salt concentrations (FIG. 8)

Example 6

Figure 9:
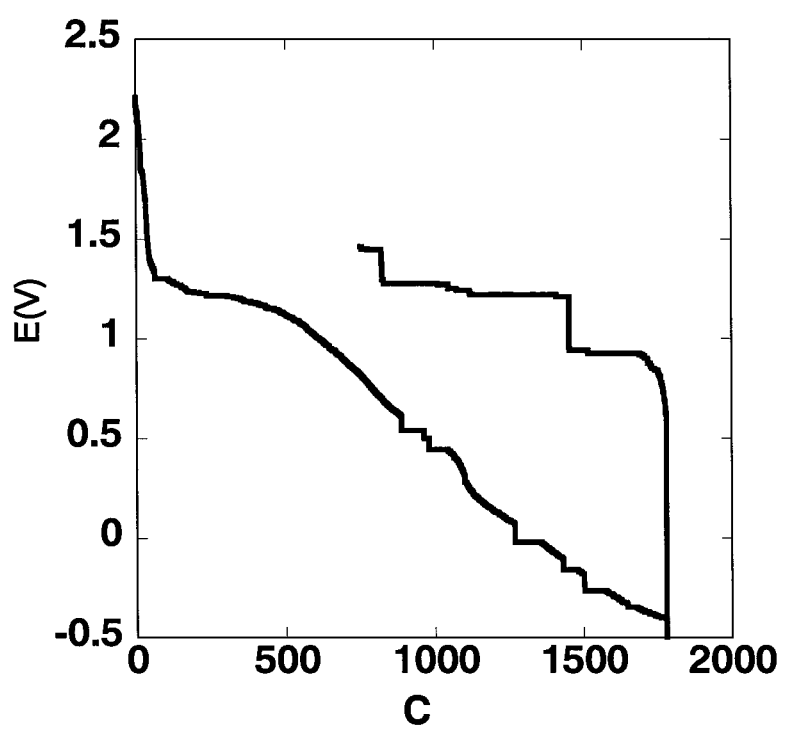
FIG. 9 is a diagram reporting PITT measurements of composite film negative electrode containing tin electrodes cycled in 0.3M $Ca(BF_4)_2$ in $EC_{0.45}:PC_{0.45}:DMC_{0.1}$ at 75° C.
Figure 10:
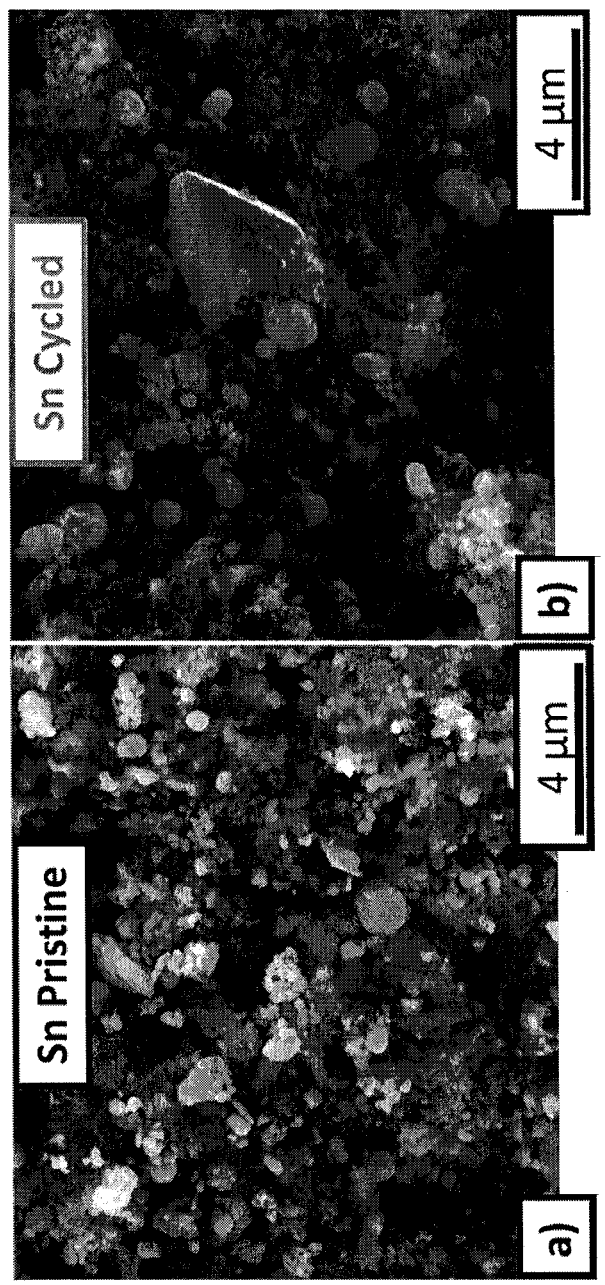
FIG. 10 are two pictures representing scanning electron microscopy images of composite powder electrode (composition: tin 80% wt. and conductive carbon black 20% wt.— conductive carbon black was Carbon Super P®, also referred to as "$C_{sp}$" commercially available from TIMCAL) a) before and b) after a complete reduction (PITT measurements). Cycling was performed at 75° C. using 0.3M $Ca(BF_4)_2$ in $EC_{0.45}:PC_{0.45}:DMC_{0.1}$ electrolyte.
Figure 11:
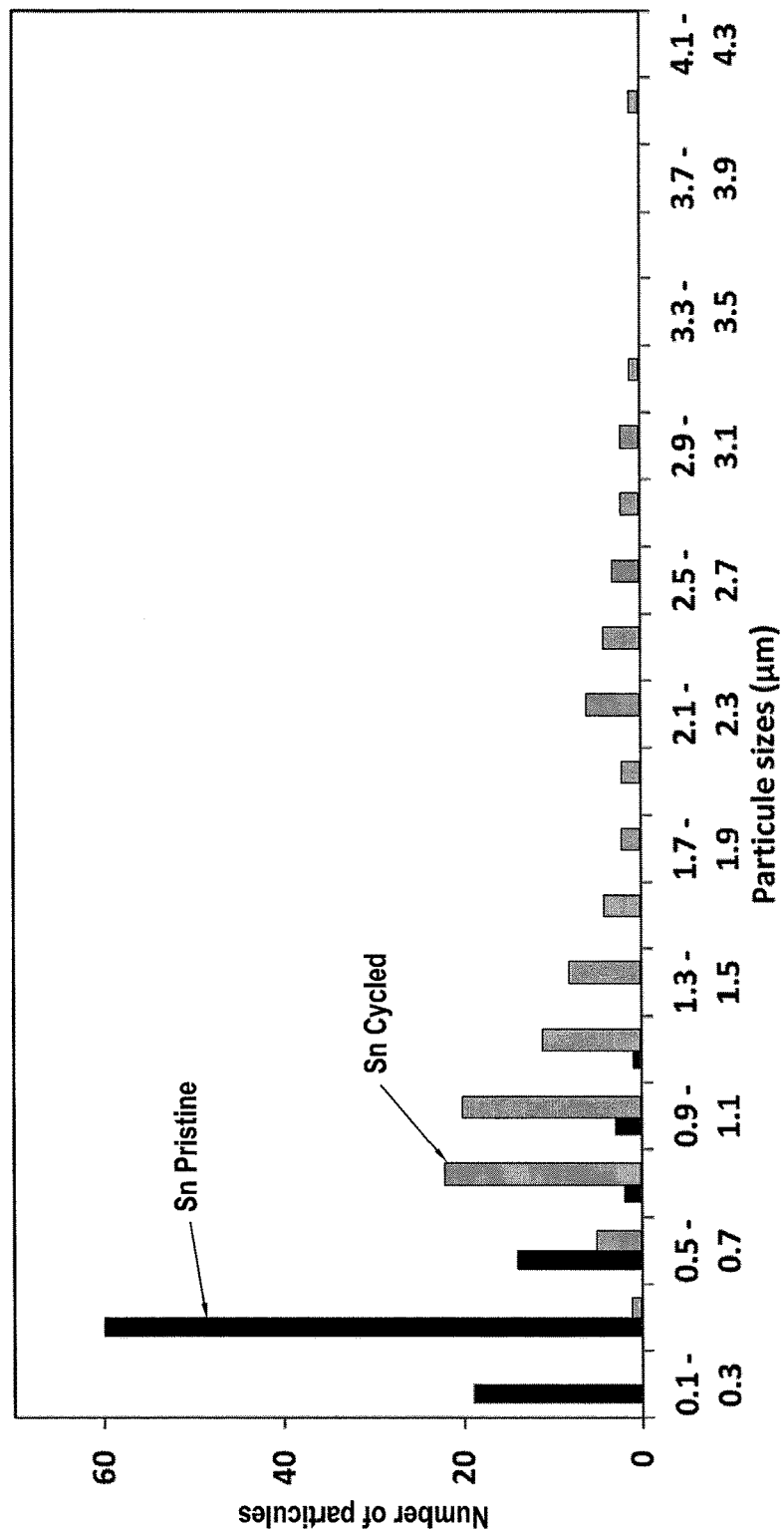
FIG. 11 is a diagram reporting the particle size distribution of tin particles used in experiments a) and b) as per FIG. 10.

Composite film containing tin as negative electrode with copper current collector and 0.3M $Ca(BF_4)_2$ in $EC_{0.45}$:$PC_{0.45}$:$DMC_{0.1}$ as electrolyte Slurries were prepared by mixing 85 wt. % of active material (i.e. tin particles having an average particle size of 150 nm, provided by Aldrich), 8 wt. % of PVDF as a binder and 7 wt. % of $C_{sp}$ as carbon additive in NMP. Mixing of the slurries was performed by magnetic stirring during 3 h, the vial containing the slurry being placed in an ultrasonic bath for 10 minutes every 1 h. Composite electrodes were prepared by depositing the slurry on a 20 micron thick copper foil with a 250 micron Doctor-Blade and further dried at 120° C. under vacuum. Once dried, 0.8 $cm^2$ disk electrodes were cut and pressed at $7.8 \times 10^8$ Pa. The resulting tin-containing composite film electrodes were then tested as anode in Swagelok type cells with a dendritic piece of calcium metal as counter and reference electrodes. Two sheets of Whattman GF/d borosilicate glass fiber were used as a separator, soaked with the electrolyte (ca. 0.5 $cm^3$ of 0.3M $Ca(BF_4)_2$ in $EC_{0.45}$:$PC_{0.45}$:$DMC_{0.1}$). Temperature was set at 75° C. during electrochemical tests using Potentiodynamic Intermittent Titration Technique (PITT) with potential steps of 5 mV. The potential was stepped to the next value when the current dropped below 2 μA (corresponding to a rate of C/400), meaning one mol of $Ca^{2+}$ per mol of tin inserted in 400 hours. Upon the first reduction, specific capacity as high as 1770 mAh/g is obtained (FIG. 9). Upon the first oxidation a capacity of ca. 1027 mAh/g was recorded indicating the reversibility to some extent of the redox process occurring upon reduction. Scanning electron microscopy images were taken on powder samples before and after full reduction down to −0.5 V vs $Ca^{2+}$/Ca (FIG. 10) and the particle size distribution (FIG. 11) was evaluated by randomly measuring the diameter of 100 particles using "ImageJ" software. A significant tin particle sizes increase was calculated after reduction with the mean diameter of the tin particles evolving from ca. 0.5 μm for the pristine powder to ca. 1.1 μm after full reduction as expected for the formation of $SnCa_n$ alloys.

Example 7

Composite powder containing tin as negative electrode with stainless steel plunger as current collector and 0.3M $Ca(BF_4)_2$ in $EC_{0.45}$:$PC_{0.45}$:$DMC_{0.1}$ as electrolyte Powders were prepared by mixing 75 wt. % of active material (i.e. tin particles having an average particle size of 150 nm, provided by Aldrich) and 25 wt. % of $C_{sp}$ as carbon additive. Mixing of the powders was performed by hand milling using an agate mortar during 15 min. Composite powder electrodes were tested as anode in Swagelok type cells with a dendritic piece of calcium metal as counter and reference electrodes. Two sheets of Whattman GF/d borosilicate glass fiber were used as a separator, soaked with the electrolyte (cs. 0.5 cm$^3$ of 0.3M Ca(BF$_4$)$_2$ in EC$_{0.45}$:PC$_{0.45}$:DMC$_{0.1}$). Temperature was set at 75° C. during electrochemical tests using Potentiodynamic Intermittent Titration Technique (PITT) with potential steps of 5 mV. The potential was stepped to the next value when the current dropped below 2 μA (corresponding to a rate of C/400), meaning one mole of Ca$^{2+}$ per mole of tin inserted in 400 hours. Scanning electron microscopy images were taken on powder samples before and after full reduction down to −0.5 V vs Ca$^{2+}$/Ca (FIG. 10) and the particle size distribution (FIG. 11) was evaluated by randomly measuring the diameter of 100 particles using "ImageJ" software. A significant tin particle sizes increase was calculated after reduction with the mean diameter of the tin particles evolving from ca. 0.5 μm for the pristine powder to ca. 1.1 μm after full reduction as expected for the formation of SnCa$_n$ alloys.

Example 8

Figure 12:
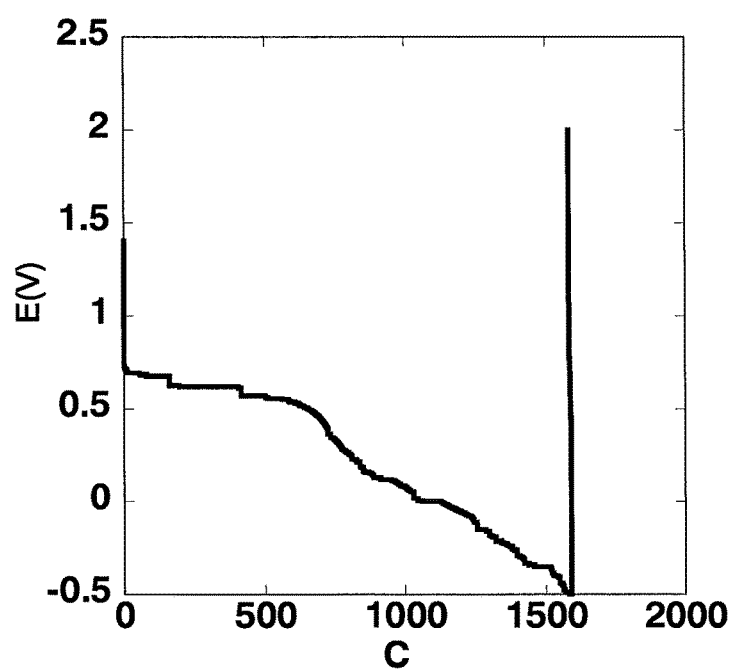
FIG. 12 is a diagram reporting the PITT measurements of composite film negative electrode containing silicon cycled in 0.3M $Ca(BF_4)_2$ in $EC_{0.45}:PC_{0.45}:DMC_{0.1}$ at 75° C.
Figure 13A:
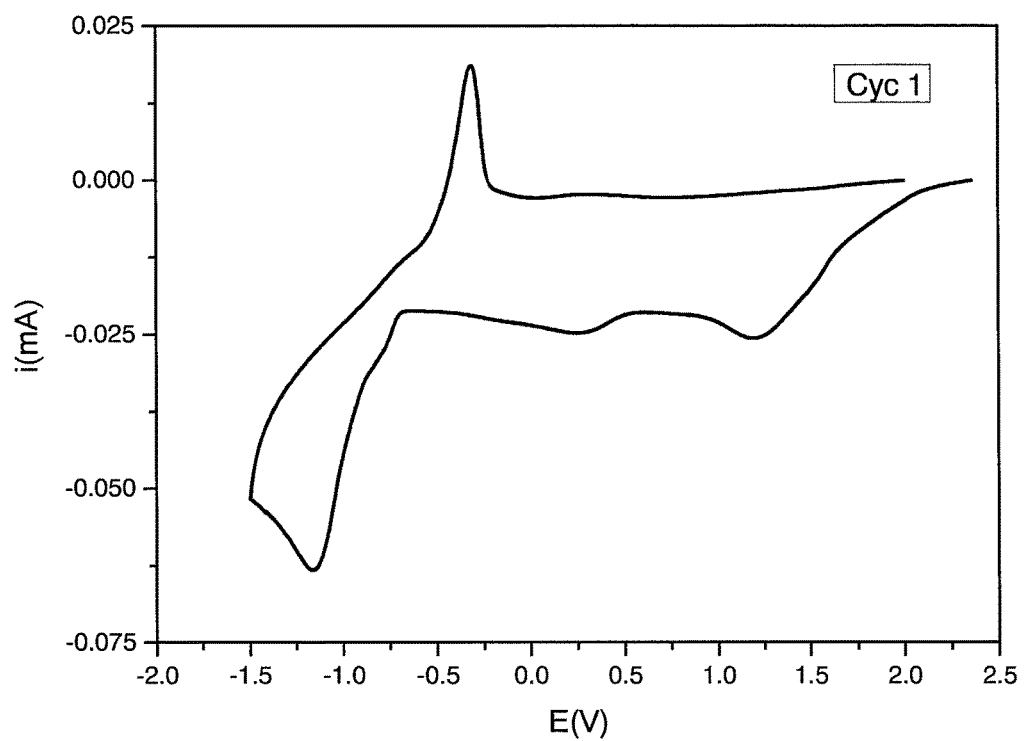
FIG. 13 are diagrams reporting cyclic voltamperommetry measurements proving the electrodeposition and stripping of calcium electrodes in certain experimental conditions. Tests conditions are 0.3M $Ca(BF_4)_2$ in $EC_{0.5}:PC_{0.5}$ at 100° C. Current collector is stainless steel. Cycles 1, 2, 3 and 10 are reported on FIG. 13a, b, c and d, respectively.
Figure 13B:
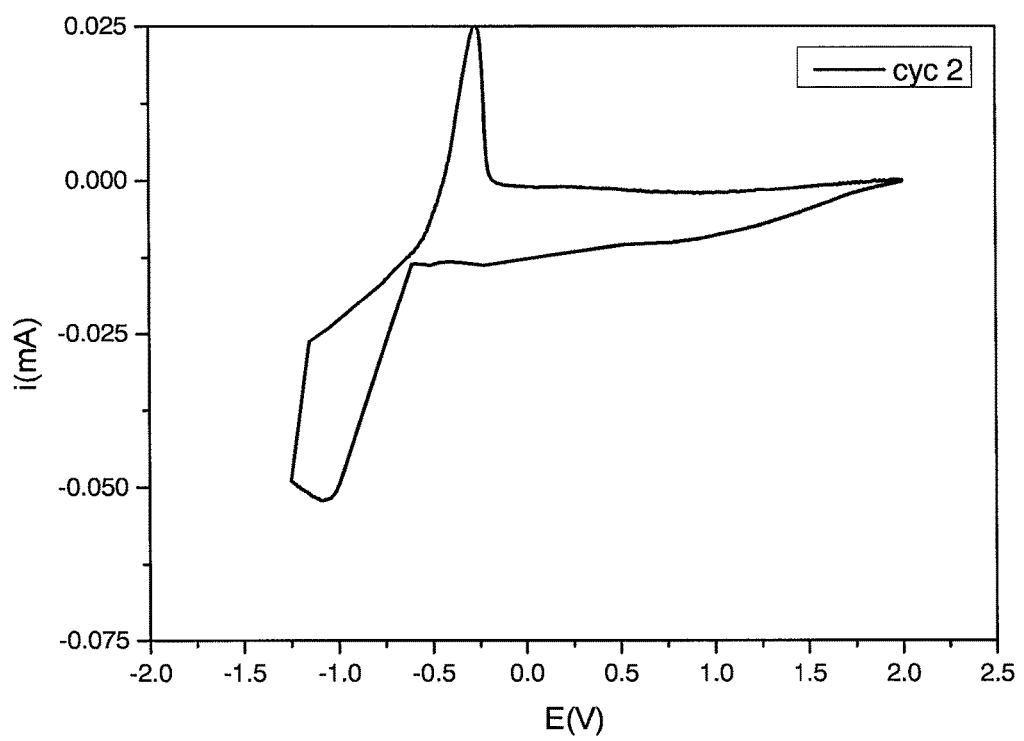
Figure 13C:
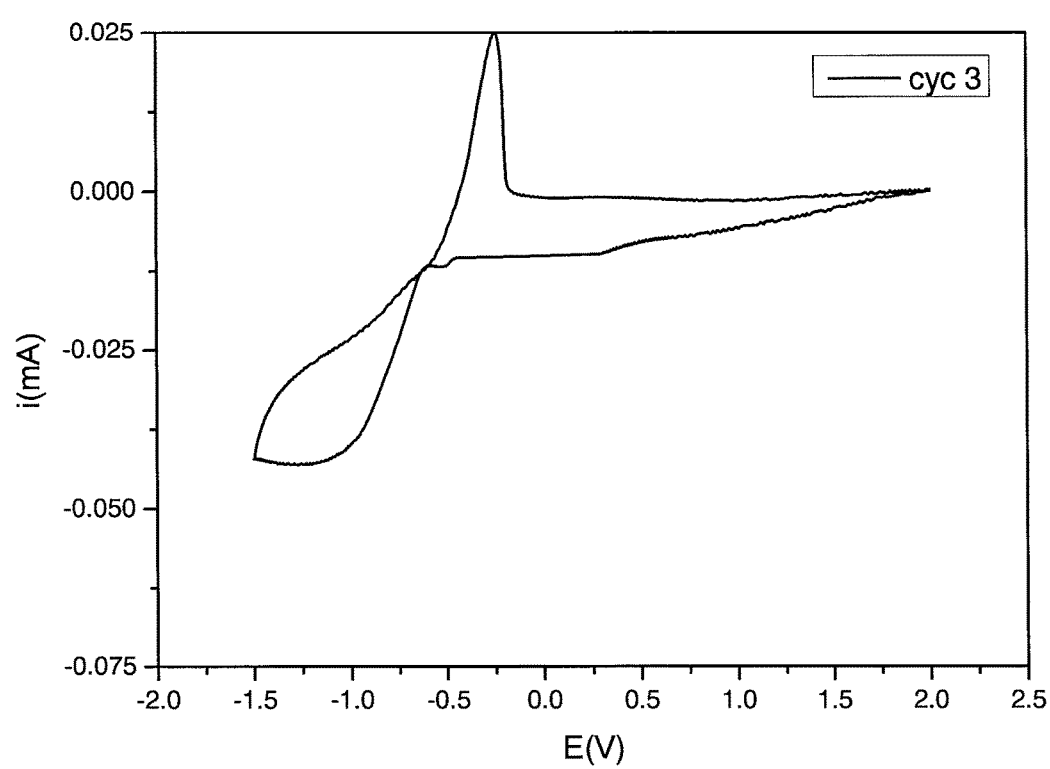
Figure 13D:
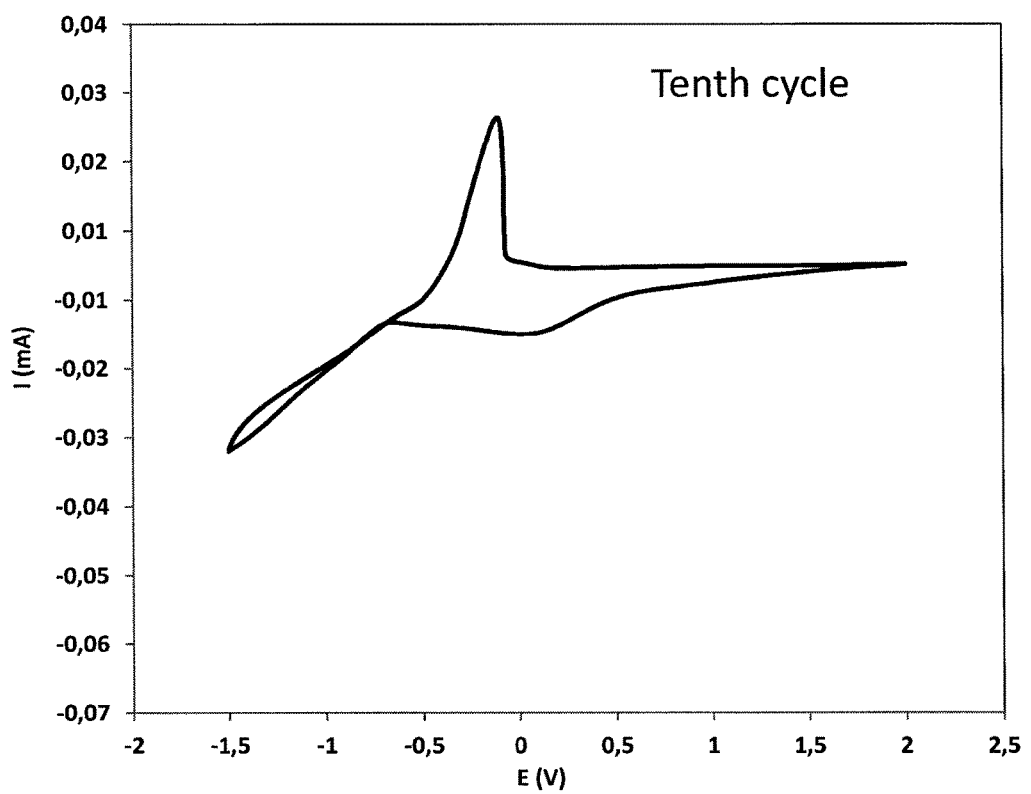

Composite film containing silicon as negative electrode with copper current collector and 0.3M Ca(BF$_4$)$_2$ EC$_{0.45}$:PC$_{0.45}$:DMC$_{0.1}$ Slurries were prepared by mixing 70 wt. % of the active material (i.e. silicon particles having average particle size of 325 mesh, provided by Aldrich), 8 wt. % of PVDF as a binder and 22 wt. % of $C_{sp}$ as carbon additive in NMP. Mixing of the slurries was performed by magnetic stirring during 3 h, the vial containing the slurry being placed in an ultrasonic bath for 10 minutes every 1 h. Composite electrodes were prepared by depositing the slurry on a 20 micron thick copper foil with a 250 micron Doctor-Blade and further dried at 120° C. under vacuum. Once dried, 0.8 cm$^2$ disk electrodes were cut and pressed at 7.8×10$^8$ Pa. The resulting silicon-containing composite film electrodes were tested as anode in Swagelok type cells with a dendritic piece of calcium metal as counter and reference electrodes. Two sheets of Whattman GF/d borosilicate glass fiber were used as a separator, soaked with the electrolyte (ca. 0.5 cm$^3$ of 0.3M Ca(BF$_4$)$_2$ in EC$_{0.45}$:PC$_{0.45}$:DMC$_{0.1}$). Temperature was set at 75° C. during electrochemical tests using Potentiodynamic Intermittent Titration Technique (PITT) with potential steps of 5 mV. The potential was stepped to the next value when the current dropped below 5 μA (corresponding to a rate of C/400), meaning one mol of Ca$^{2+}$ per mol of tin inserted in 400 hours. Upon the first reduction specific capacity as high as 1589 mAh/g (FIG. 12) was obtained related to a pseudo plateau centered at ca. 0.6 V vs. Ca$^{2+}$/Ca.

Example 9

Calcium metal negative electrode with stainless steel current collector and 0.3M Ca(BF$_4$)$_2$ in EC$_{0.5}$:PC$_{0.5}$ as electrolyte.

In this example 9, cyclic voltammetry (CV) at 0.5 mV/sec was performed at 100° C. for 20 cycles in three electrode Swagelok type cell with pieces of calcium metal (provided by Aldrich) as counter and reference electrodes. The working electrode current collector was stainless steel. Two sheets of Whattman GF/d borosilicate glass fiber were used as a separator, soaked with the electrolyte (ca. 0.5 cm$^3$ of 0.3M Ca(BF$_4$)$_2$ in EC$_{0.5}$:PC$_{0.5}$). CVs were performed at 100° C. and potential was swept between −1.5 and 2 V vs. Ca$^{2+}$/Ca (see FIG. 13). Significant oxidation and reduction currents were measured. Onset potentials for plating and stripping of calcium are respectively, ca. −0.68 V and ca. −0.5 V vs. Ca$^{2+}$/Ca.

The invention claimed is:

1. A calcium-based secondary cell comprising:
   a negative electrode that includes a negative-electrode active material comprising metallic calcium or a calcium alloy, said negative-electrode active material being capable of accepting and releasing calcium ions,
   a positive electrode that includes a positive-electrode active material, said positive-electrode active material being capable of accepting and releasing calcium ions,
   an electrolyte arranged between the negative electrode and the positive electrode, said electrolyte comprising calcium ions and an electrolyte medium, wherein the electrolyte is not solid at a temperature of about 20° C. and a pressure of about 1 atm and wherein the electrolyte medium includes a non-aqueous solvent, and
   a temperature control element,
   wherein the temperature control element is configured to bring and/or maintain the cell at a temperature between about 75° C. and 110° C.

2. The cell according to claim 1, wherein the electrolyte has a viscosity of lower than 10 cP at a temperature of about 20° C. and a pressure of about 1 atm.

3. The cell according to claim 1, wherein the solvent is selected from the group consisting of cyclic carbonates, linear carbonates, cyclic esters, cyclic ethers, linear ethers and mixtures thereof.

4. The electrolyte according to claim 3, wherein the solvent includes ethylene carbonate (EC).

5. The cell according to claim 1, wherein the temperature control element is an integral cell thermal management device including a heating means.

6. The cell according to claim 1, wherein the negative electrode active material includes metallic calcium.

7. The cell according to claim 1, wherein the negative-electrode active material comprises a calcium alloy which is such that the potential of the negative electrode is lower than about 2.5V vs. Ca$^{2+}$/Ca and has a specific capacity which is higher than about 200 mAh/g.

8. The cell according to claim 7, wherein the alloy has formula (I) Ca$_m$B wherein m is 0<m≤3 and B is a metal or a semi-conductor element.

9. The cell according to claim 1, wherein the negative electrode is a composite film negative electrode.

10. A non-aqueous calcium-based secondary battery comprising a calcium-based secondary cell according to claim 1.

11. A vehicle, an electronic device or a stationary power generating device comprising a non-aqueous calcium-based secondary battery according to claim 10.

12. The cell according to claim 1, wherein the positive-electrode active material is a vanadium oxide.

13. A method for operating a calcium-based secondary cell, the cell comprising:
   a negative electrode that includes a negative-electrode active material comprising metallic calcium or a calcium alloy, said negative-electrode active material being capable of accepting and releasing calcium ions, a positive electrode that includes a positive-electrode active material, said positive-electrode active material being capable of accepting and releasing calcium ions, and an electrolyte arranged between the negative electrode and the positive electrode, said electrolyte comprising calcium ions and an electrolyte medium, wherein the electrolyte is not solid at standard conditions and wherein the electrolyte medium includes a non-aqueous solvent, the method comprising the step of setting cell operating temperature between about 75° C. and 110° C.

14. The method according to claim 13, wherein the step of setting cell operating temperature comprises using a temperature control element.

15. The method according to claim 13, wherein the positive-electrode active material is a vanadium oxide.

* * * * *